United States Patent [19]
Ware

[11] Patent Number: 5,583,652
[45] Date of Patent: Dec. 10, 1996

[54] SYNCHRONIZED, VARIABLE-SPEED PLAYBACK OF DIGITALLY RECORDED AUDIO AND VIDEO

[75] Inventor: Malcolm S. Ware, Raleigh, N.C.

[73] Assignee: International Business Machines Corporation, Armonk, N.Y.

[21] Appl. No.: 233,902

[22] Filed: Apr. 28, 1994

[51] Int. Cl.$^6$ .............................. H04N 5/91; H04N 5/76
[52] U.S. Cl. ............................................... 386/75; 386/104
[58] Field of Search ...................................... 358/312, 335, 358/341, 343, 342; 360/10.1, 19.1; 348/515, 472, 441

[56] References Cited

U.S. PATENT DOCUMENTS

| | | | |
|---|---|---|---|
| 4,794,465 | 12/1988 | Van Luyt et al. | 358/341 |
| 4,994,912 | 2/1991 | Lumelsky et al. | 348/441 |
| 5,045,940 | 9/1991 | Peters et al. | 348/472 |
| 5,420,801 | 5/1995 | Dockter et al. | 364/514 R |

FOREIGN PATENT DOCUMENTS

| | | | |
|---|---|---|---|
| 0407970 | 7/1990 | European Pat. Off. | H04N 5/93 |
| 0534620 | 8/1992 | European Pat. Off. | G11B 5/86 |

*Primary Examiner*—Tommy P. Chin
*Assistant Examiner*—Y. Lee
*Attorney, Agent, or Firm*—Steven B. Phillips

[57] ABSTRACT

Method and system for providing user-controlled, continuous, synchronized variable-speed playback of a previously recorded digital audio/video presentation. The user directly controls the rate of playback and the audio and video remain synchronized. The audio is expanded or compressed using the time domain harmonic scaling method so that the pitch of the audio remains undistorted. Synchronization is maintained by allowing one clock to serve as the master time clock for the system. The clocks which can serve as the master time clock include the audio decoder clock, the video decoder clock, and the system clock. The invention is particularly useful in multimedia display systems designed to display MPEG data.

9 Claims, 7 Drawing Sheets

SYNCHRONIZED, VARIABLE-SPEED PLAYBACK OF DIGITALLY RECORDED AUDIO AND VIDEO

BACKGROUND

1. Field of the Invention

This invention relates to the way a digital audio and video data stream is decoded and played back to the user of a display system. It is applicable to any data stream, whether the data stream is received from a communications channel, or from a storage device such as an optical disk player. It is particularly useful in multimedia applications.

2. Prior Art

Currently, all simultaneous audio/video (A/V) playback is accomplished at essentially the recorded speed. It is well known in the art how to speed up and slow down video, with the audio portion of a presentation blanked out. This is done in video disk players and video cassette recorders routinely. Since the video is encoded on a frame-by-frame basis, the rate of frame display is slowed down, and each frame is displayed on a display device for an extended period, each period extending over multiple refreshes of the display device. The audio in this situation must be blanked out because it would be distorted beyond recognition by pitch changes.

It is also well known in the art how to speed up and slow down audio by itself without significant distortion. The technique most commonly used is Time Domain Harmonic Scaling or TDHS. In TDHS, a stream of audio is divided into pitch periods. The pitch periods are small enough so that there is a high degree of pitch similarity between adjacent intervals. When the audio stream is played back, pitch periods are added or drawn away as many times as needed to produce the desired playback rate, with little perceptible distortion in the audio pitch. For a given desired speech rate C defined as the ratio between the input signal length and the output signal length, a period of time T is defined in which the TDHS process is done once. If the audio is digitally encoded, T is also the time that it takes to play back an audio frame, where an audio frame consists of the samples collected in a fixed period of time, typically 1/30th of a second.

For expansion of the audio, an input signal of length T will produce and output signal of length T+P where P is the pitch period. If T is given in P units, for C<1.0:

$$C = \frac{T}{T+1}$$

and so:

$$T = \frac{C}{1-C}$$

Similarly, for audio compression (faster playback) C>1.0, therefore:

$$T = \frac{C}{C-1}$$

Every T, a weighted average window is defined on two input segments residing one pitch period apart. The output signal is defined by the following formula:

$$S(t+i) = S(t+i)W(t) + S(t+i+P)[1-W(t)]$$

The one pitch-length output segment is either added to the signal in between the two adjacent segments (for expansion) or replaces the two segments, effectively replacing two segments with one (for compression).

Figure 5A:
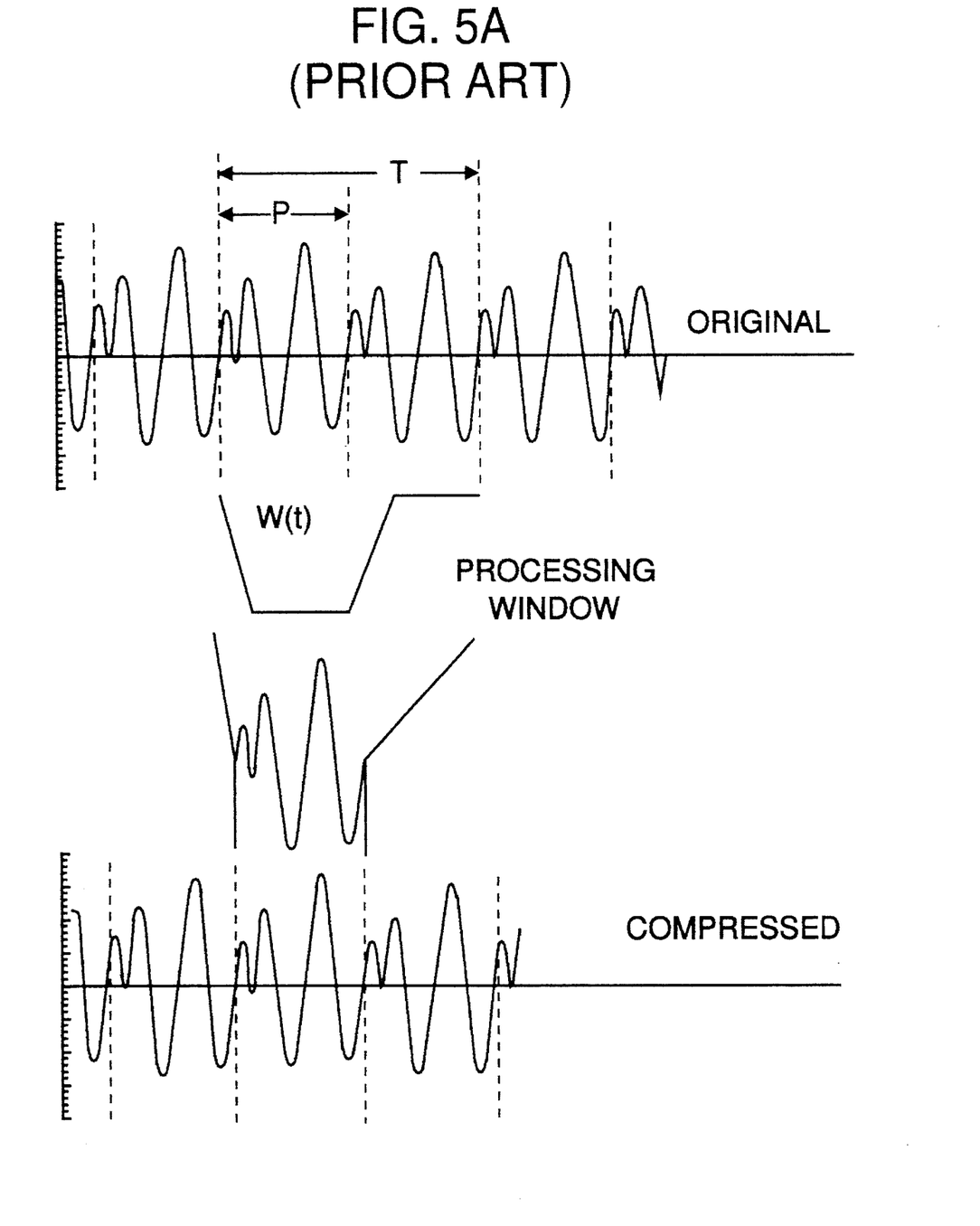
FIG. 5A illustrates how the Time Domain Harmonic Scaling method is used to compress an audio signal.
Figure 5B:
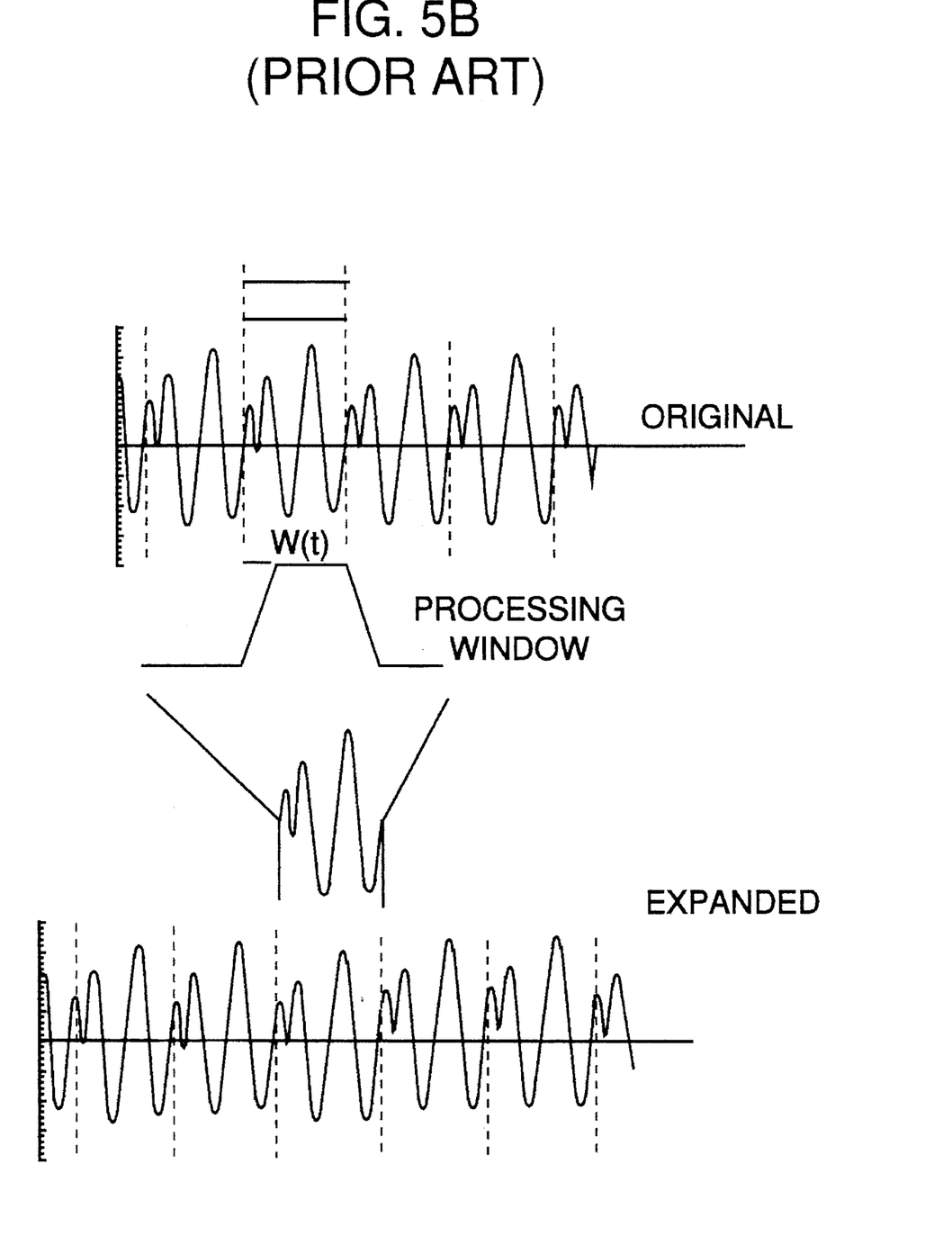
FIG. 5B illustrates how the Time Domain Harmonic Scaling method is used to expand an audio signal.

FIG. 5A is a waveform diagram illustrating the compression process and FIG. 5B is a waveform diagram illustrating the expansion process. The transient period of the window is rather short to keep the compressed or expanded signal as close to the original signal as possible. However, the period must be long enough to eliminate discontinuities.

Time Domain Harmonic Scaling is explained in detail in the article "Time-Domain Algorithms for Harmonic Bandwidth Reduction and Time Scaling of Speech Signals," by D. Malah, *IEEE Transactions on Acoustics, Speech, and Signal Processing,* Vol. ASSP-27, pp. 121–133, 1979, which is incorporated herein by reference. Information on Time Domain Harmonic. Scaling is also contained in U.S. Pat. No. 4,890,325 to Taniguchi et al. which is incorporated herein by reference.

The techniques described above are generally applicable to digital or analog systems. In analog A/V systems which operate only at recorded speeds, audio and video are synchronized because they are physically recorded together. In digital systems a master time clock is involved. The video and audio are digitized separately and then multiplexed together. Usually, the video and audio data streams are also independently compressed before they are combined, although it is possible to multiplex together uncompressed digital audio and video and compress the final digital signal later.

During playback, in digital A/V systems audio and video decoders require timing information. Where the audio and video streams are compressed, the decoder decompresses them and clocks each frame out to the next stage for playback using the timing information. If the streams are uncompressed, the decoders would simply use the timing information to control audio and video buffers and send the frames to the next stage at the appropriate rate. In any case, the decoders must maintain synchronization between the audio and video within one video frame interval (usually 1/30th second) in order to ensure that a user perceives a synchronized A/V presentation.

One well-known standard for synchronized recording and playback of compressed digital audio and video data streams is the so-called "MPEG" (Motion Picture Experts Group) standard. The latest version of the MPEG standard is published as Committee Draft 11172-2, "Coding of Moving Pictures and Associated Audio for Digital Storage Media at up to about 1.5 Mbit/s," November, 1991, and is incorporated herein by reference.

As can be seen from the above discussion, the prior art includes systems for variable speed playback of audio alone, variable speed playback of video alone, and a way of recording and playing back compressed, synchronized digital audio and video data. What is needed is a system which uses all of these techniques to provide a way for a user who is playing back a digital A/V presentation to vary the speed of presentation and be presented with synchronized, high quality audio and video from a digital source. This would allow the user to cue the information based on either the audio or the video content, or both, and to slow down or speed up the rate of presentation and still perceive both the audio and the video.

SUMMARY

The present invention satisfies the above needs by providing a system and method for allowing user-controlled, variable-speed synchronized playback of an existing, digitally-recorded audio/video presentation. In the preferred embodiment, the user is supplied with the image of a speed control on a display screen that can be adjusted with a mouse or similar pointing device. The digital data stream is a multiplexed, compressed audio/video data stream such as that specified in the MPEG standard. The data stream can come from a communications channel or a storage device such as an optical disk. The invention is particularly useful in a multimedia computer system.

The invention has three alternative preferred embodiments. In one preferred embodiment, the user directly controls the rate of the video playback by setting a video scaling factor. The length of time required to play back an audio frame is then adjusted automatically using the time domain harmonic scaling (TDHS) method so that it approximately matches the length of time a video frame is displayed. Since the audio frame is scaled using the TDHS method, it is played back without distortion in pitch. The number of frames of compressed digital audio in an audio buffer is monitored and the time domain harmonic scaling factor is adjusted continuously during playback to ensure that the audio buffer does not overflow or underflow. An underflow or overflow condition in the audio buffer would eventually cause a loss of synchronization between the audio and video.

In the second preferred embodiment of the invention, the user directly controls the rate at which audio frames are played by adjusting the time domain harmonic scaling factor. The portion of the system which controls the rate of display of video frames then automatically displays each frame from a video buffer for the amount of time it takes to play back the associated audio frame. This embodiment is simpler to implement because the audio buffer does not need to be monitored for overflow and underflow conditions.

In the third preferred embodiment, a scaling factor is input to a system clock. The scaling factor controls the speed of the system clock and the system clock in turn controls the rate of audio and video playback. Audio is played back using the TDHS method, and the audio buffers are monitored for overflow and underflow in the same manner as in the first preferred embodiment.

The system in which the preferred embodiment of the invention is used consists of apparatus to play digital audio including a transducer, display apparatus to display digital video, and digital audio and video buffers to store compressed, digital audio and video frames from the multiplexed audio/video data stream. In between the buffers and the display and audio apparatus are audio and video decoders, a time domain harmonic scaler, and a processor subsystem including a microprocessor to control the playback of the presentation. The processor subsystem monitors and controls the other components and performs all necessary calculations.

Since the audio and video decoders must be synchronized, one of the clocks in the system must serve as the master time clock. In the first preferred embodiment, the video decoder clock serves as the master time clock and the audio decoder clock is controlled by the video decoder clock. In the second preferred embodiment, the audio decoder clock serves as the master time clock, and controls the video decoder clock. In the third preferred embodiment, the system clock serves as the master time clock and the audio and video decoder clocks are each independently synchronized to the system clock.

The entire system, except for the video display and audio transducer, can be implemented on a single semiconductor chip. Alternatively, a chip can be provided for each of the various functions and the system can be assembled on a printed circuit board, or a group of printed circuit boards. Such a collection of printed circuit boards can be fitted as one or more adapter cards for a general purpose computer system.

DETAILED DESCRIPTION OF THE PREFERRED EMBODIMENTS

The present invention most typically finds application in an audio/video playback system in which individually compressed audio and video data streams are separated from a single, multiplexed data stream such as is defined in the MPEG standard. Such a system is shown at 400 in FIG. 4. As discussed in the BACKGROUND section, one time clock must serve as the master time clock for both audio and video decoding. In a system designed to play MPEG data, the audio and video data streams must be decompressed and the audio and video decoders must each be provided with a clock source. Therefore, there are actually three preferred embodiments of this invention, one in which the audio decoder clock is the master clock, one in which the video decoder clock is the master clock, and one in which the system clock serves as the master time clock. An audio decoder and its associated clock are shown at 407 of FIG. 4. A video decoder and its associated clock are shown at 405 of FIG. 4. A system clock is shown at 417 of FIG. 4. A system can be implemented with any of the three embodiments. It is also possible to include two or three embodiments in one system, and have the mode of operation controlled by software for best results. In any of the preferred embodiments, the clocks each consist of a 32 bit block counter and a local real time clock.

The 32 bit block counter or timer serving as the master time clock is literally slowed down or sped up based on the selected scaling factor. Every time a decoder decodes a block, it increments its local real time clock according to the block's original recording period. For example, if the video was recorded at 30 frames per second, then every video decode increments the 32 bit block counter or timer by the equivalent of 1/30th of a second or 33.3 milliseconds. If the audio frame, for example, an MPEG, layer 1 audio frame containing 384 samples, is decoded, its period corresponds to a recorded duration of 384/44100 (in the case of the common 44100 Hz sampling rate) or 8.707 milliseconds.

The synchronization to the master time clock is accomplished by decoding of audio or video frames more rapidly or more slowly such that the local audio or video decoder clock stays close to being synchronized with the master time clock. If the audio decoder clock is the master time clock, then according to the setting of the user-selected scaling factor C, the audio decoder will decode audio frames more rapidly or more slowly. In this case the master time clock tracks the audio decoder clock precisely, and the video decoder clock monitors the master time clock. The video decoder decodes the next video frame whenever its clock so indicates. Otherwise, it waits. In the case where the video decoder clock is the master time clock, the system clock tracks the video decoder clock precisely. The setting of user-selected scaling factor for video speed control may result in more or less video frames being decoded per second, and thus, the video decoder clock will increment more rapidly or more slowly. The audio decoder clock then tracks the system clock (which is simply keeping pace with the video decoder clock). Due to the requirements of the audio decoder and time domain harmonic scaler having to keep decoding and scaling audio frames, the time domain harmonic scaling factor must be continuously adjusted to avoid overflow or underflow of the audio buffers. Since the audio and video data streams were originally synchronized, if the video decoder is decoding more rapidly, as an example, there will be more audio frames being placed in the audio buffer in a given time period.

Finally, in the embodiment where an externally controlled scaling factor is being adjusted, the system clock serves as the master time clock. In this case both the audio and video decoder clocks must synchronize themselves to the system clock rate.

In any of the three embodiments, the rate of playback is preferably continuously controlled by a user moving a mouse to slide or drag a control displayed on a screen. The rate of playback preferably has a range of 0.333 to 3.0 times the recorded rate in frames per second. However, in any case, the maximum rate cannot be greater than the rate at which the audio and video data is being fed to the system. The system 400 of FIG. 4 will be discussed in greater detail below.

Figure 1:
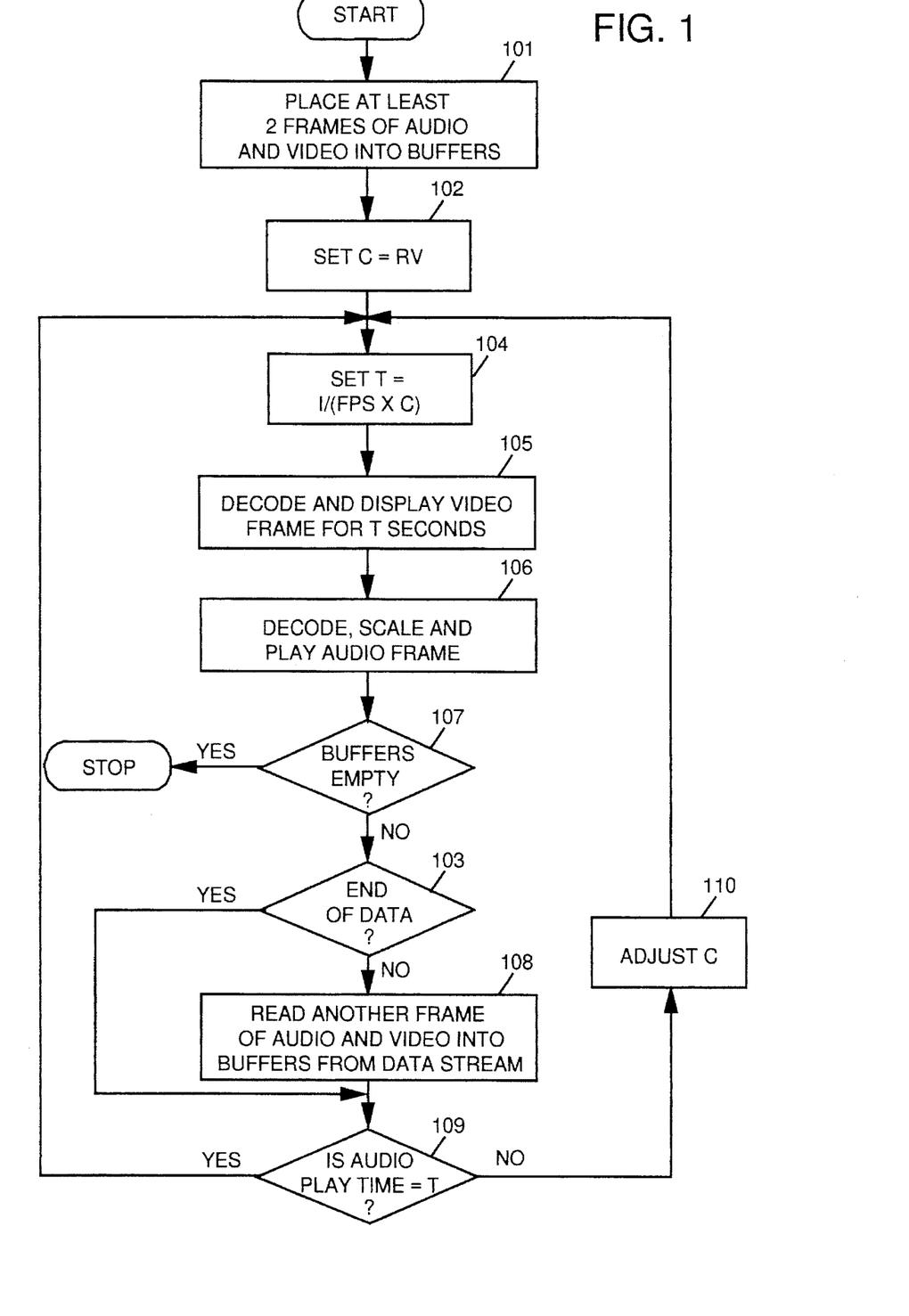
FIG. 1 is a flowchart illustrating the general method from start to finish of variable-speed playback of synchronized digital audio and video data streams where either the video decoder clock or the system clock serves as the master time clock.

FIG. 1 shows the method, including initialization, by which synchronization is maintained in the case where either the video clock or the system clock serves as the master time clock. Where the video decoder clock serves as the master time clock, the user directly controls the video playback rate in frames per second by adjusting a video scaling factor, RV. In either case the data was originally recorded at given rate in frames per second, FPS. In the preferred embodiment in which the video decoder clock is the master time clock, the value of RV is set to a proportional value of the recorded rate where playback at the recorded rate corresponds to RV=1. An RV less than 1 corresponds to slower playback; an RV more than 1 corresponds to faster playback. For example, playback at one half the recorded rate corresponds to RV=0.5, and playback at twice the recorded rate corresponds to RV=2. Where the system clock serves as the master time clock, we also refer to the selected scaling factor as "RV" and the preceding discussion applies.

Initially, at least two frames of audio and two frames of video are placed in separate audio and video buffers at 101. The buffers are the circular or first-in-first-out (FIFO) type. A time domain harmonic scaling factor, C, as previously discussed is then set equal to RV at 102. At 104 of FIG. 1, the time T required to playback an audio frame with the established scaling factor is calculated using the equation:

$$T = \frac{1}{(FPS \times C)}$$

A video frame is then taken from the video buffer, decoded, and displayed on the display device for T seconds at 105. Simultaneously at 106, an audio frame is taken from the audio buffer, decoded, and played using the time domain harmonic scaling method with scaling factor C. At 107, the system checks to see if there is any more data left in the buffers to play, and stops if there is not. At 103, the system checks to see if the data streams of audio and video from the original, multiplexed signal have ended. If not, the next frame of compressed, digital audio and the next frame of compressed, digital video are loaded into the respective buffers at 108. If the end of the data stream has been reached, the process repeats without step 108 until the buffers are empty.

Assuming there are more frames of data to be played, the process can simply return to step 104 where the scaling factors are set, and play the next frame. This method works and maintains synchronization, but only for short bursts of audio and video of only a few frames. For long, continuous streams of audio and video, steps must be performed to adjust the audio scaling factor C between frames in order to maintain synchronization. Significant adjustment is needed if the user changes the selected playback rate in mid-stream. However, even if the user does not change or is not permitted by the application software to change the playback rate, these steps must be performed because in the preferred embodiment, each clock is based on the incrementing of a 32 bit block counter, not on an analog timer. Therefore the exact number of audio samples in each frame will vary randomly. Thus, although T is calculated initially at 104, and even if the selected playback rate is not changed, the playing of an audio frame may take an amount of time slightly greater than or less than T. Eventually, the audio buffer can overflow, meaning there is not enough room for the next frame from the audio data stream in the buffer when it is time to load the frame, or the buffer can underflow, meaning the buffer is empty when the next frame needs to be decoded.

To prevent buffer underflow and overflow from occurring, and to allow for midstream changes in the selected playback rate, the time domain harmonic scaling factor C is adjusted as necessary after each frame is played. A determination is made at 109 of FIG. 1 as to whether an adjustment is needed because the playback time was not equal to T, and if needed, the adjustment is made at 110. All of the preceding discussion applies to both the case where the video decoder clock is the master time clock and the case where the system clock is the master time clock. The calculations and adjustments required in each case are the same.

Figure 2:
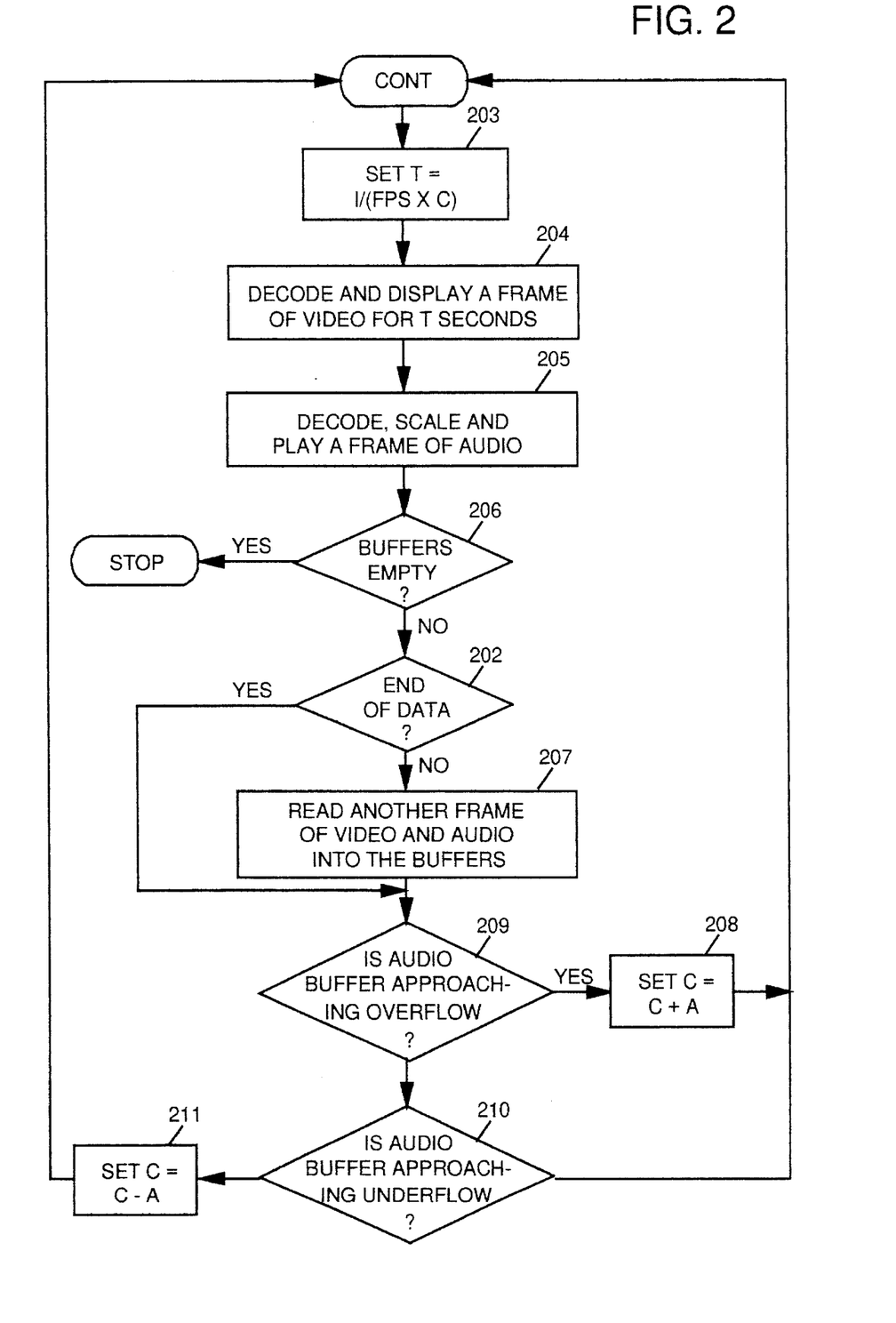
FIG. 2 is a flowchart showing the frame-by-frame detail of the method of FIG. 1.

FIG. 2 shows the method of the present invention in more detail, mid-stream during playback, again in the case where either the video clock serves as the master time clock or the system clock serves as the master time clock. All the calculations and adjustments are the same whether the system clock serves as the master time clock or the video decoder clock serves as the master time clock. At the beginning of each frame 203, the total time T it will take to play back an audio frame with the selected scaling factor is calculated. This calculation must be performed at the beginning of each frame, as the scaling factor in the preferred embodiment can be changed by the user at any time. A frame of video is taken from the video buffer, decoded, and displayed for T seconds at 204. The corresponding audio frame is taken from the audio buffer, decoded, scaled and played back at 205. At 206, the system checks to see if the buffers are empty. If the buffers are empty, play ends. At 202, the system checks for the end of the data streams and, if the end has not been reached, the system then reads in another frame of video and another frame of audio from the data stream into the respective buffers at 207. If the data stream has ended, step 207 is skipped and no more frames are read into the respective buffers.

As previously explained, the process can repeat from this point, and the system would operate properly for short bursts of data. However, if long, continuous play of audio/video data is desired, additional steps must be performed to prevent a loss of synchronization due to audio buffer overflow or audio buffer underflow. At 209, the system checks to determine if the audio buffer is approaching overflow. If it is, the time domain harmonic scaling factor C is reset at 208 according to the equation C=C+A, where A is an adjustment factor to be discussed below. If the audio buffer is not approaching overflow, the system then checks at 210 to see if the audio buffer is approaching an underflow condition. If not, the system plays the next frame by repeating the steps discussed above. If the buffer is approaching underflow, the system resets the time domain harmonic scaling factor according to the equation C=C−A at 211 and then plays the next frame. Note that the sequence of checking for overflow followed by checking for underflow can be reversed, and the operation of the system is the same. Neither sequence is preferred over the other for these two steps.

In this preferred embodiment, the adjustment factor A is set to some specific fraction of the current value of the scaling factor C. The adjustment factor is recalculated each time an adjustment is needed, either at 208 or 211 of FIG. 2. The adjustment factor must be recalculated for each frame because the value of C can change for each frame, and A is set to a specific, current fractional value of C. The fractional value must be large enough so that any sudden change in the speed of playback can be accommodated without causing an underflow or overflow condition in the audio buffer, and yet small enough so that adjustments are not so large and abrupt as to be displeasing to the user's perception when the user changes the selected playback speed. The user should perceive only gradual changes in the speed of playback when the scaling factor is adjusted. The inventor has found that values for A from 1/1000 to 1/3 of C work well, with a value of 1/10 of C working the best.

Figure 3:
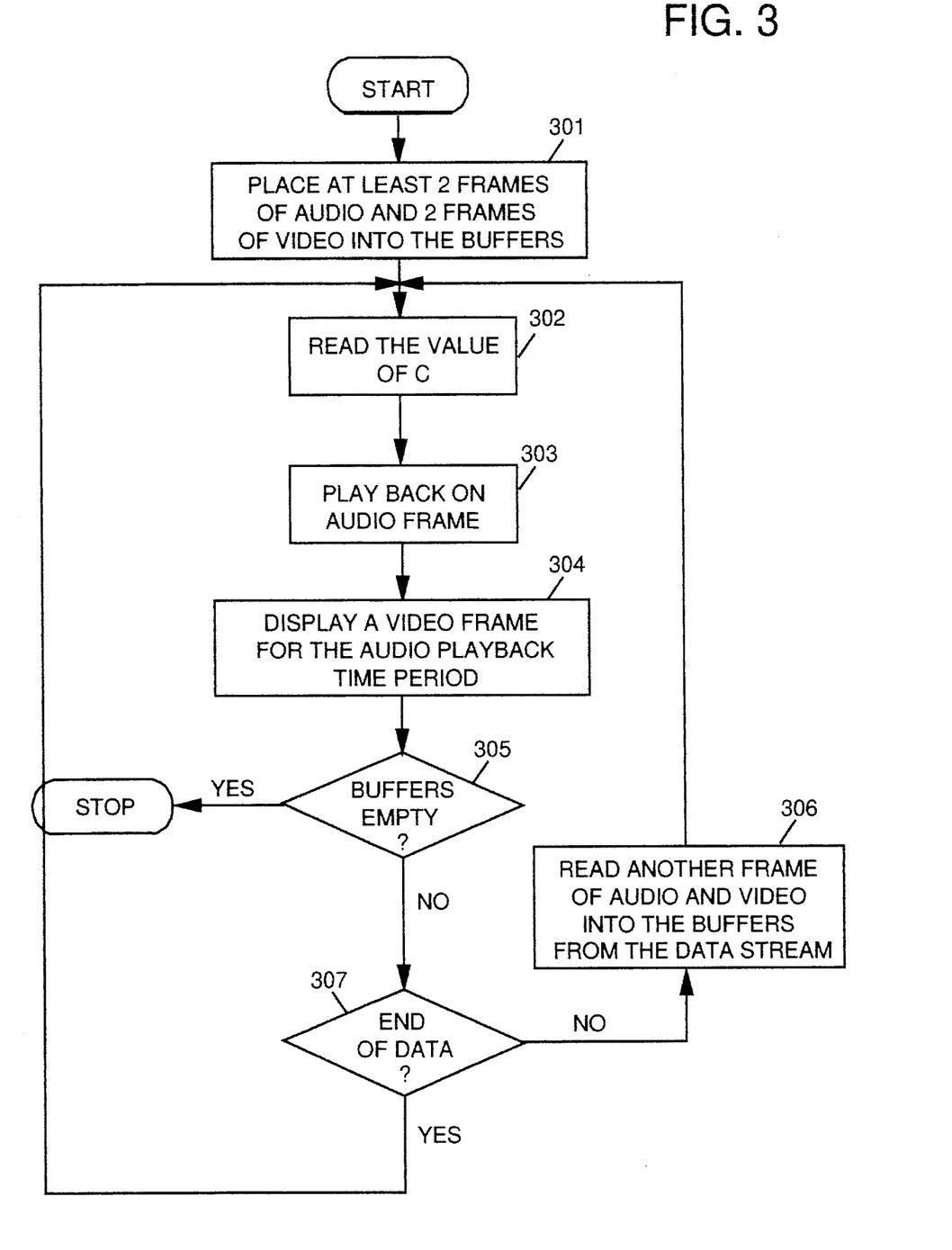
FIG. 3 is a flowchart showing the method of variable-speed playback of synchronized digital audio and video data streams where the audio decoder clock serves as the master time clock.

FIG. 3 shows the method of the third preferred embodiment, that in which the audio clock serves as the master time clock for the playback system. This embodiment will usually be preferable, since it is simpler to implement because it does not require that the audio buffer be monitored for overflow and underflow conditions.

The playback commences and at least two frames of compressed, digital audio and two frames of compressed, digital video from the data stream are loaded into the respective buffers at 301. In this embodiment, the user controls the time domain harmonic scaling factor C directly. C=1 corresponds to playback at the originally recorded rate and no scaling is performed. A factor C less than 1 corresponds to slower playback, and a factor C greater than 1 corresponds to faster playback. The user selected value is determined and assigned to C at 302. An audio frame is decoded, scaled, and played back using the time domain harmonic scaling method with scaling factor C at 303. A video frame is simultaneously decoded and played back at 304. The video frame is displayed for as long as it takes to play back the audio frame with the current scaling factor. At 305 the system checks to see if the buffers are empty, and ends play if they are. At 307, the system checks to see if the end of the audio and video data streams from the original multiplexed signal has been reached. If the end of the data streams has not been reached, another frame of digital audio and another frame of digital video from the data stream are loaded into the respective buffers at 306 and the process repeats. If the original data stream has ended, the process repeats without step 306 until all of the frames in the buffers have been played.

Figure 4:
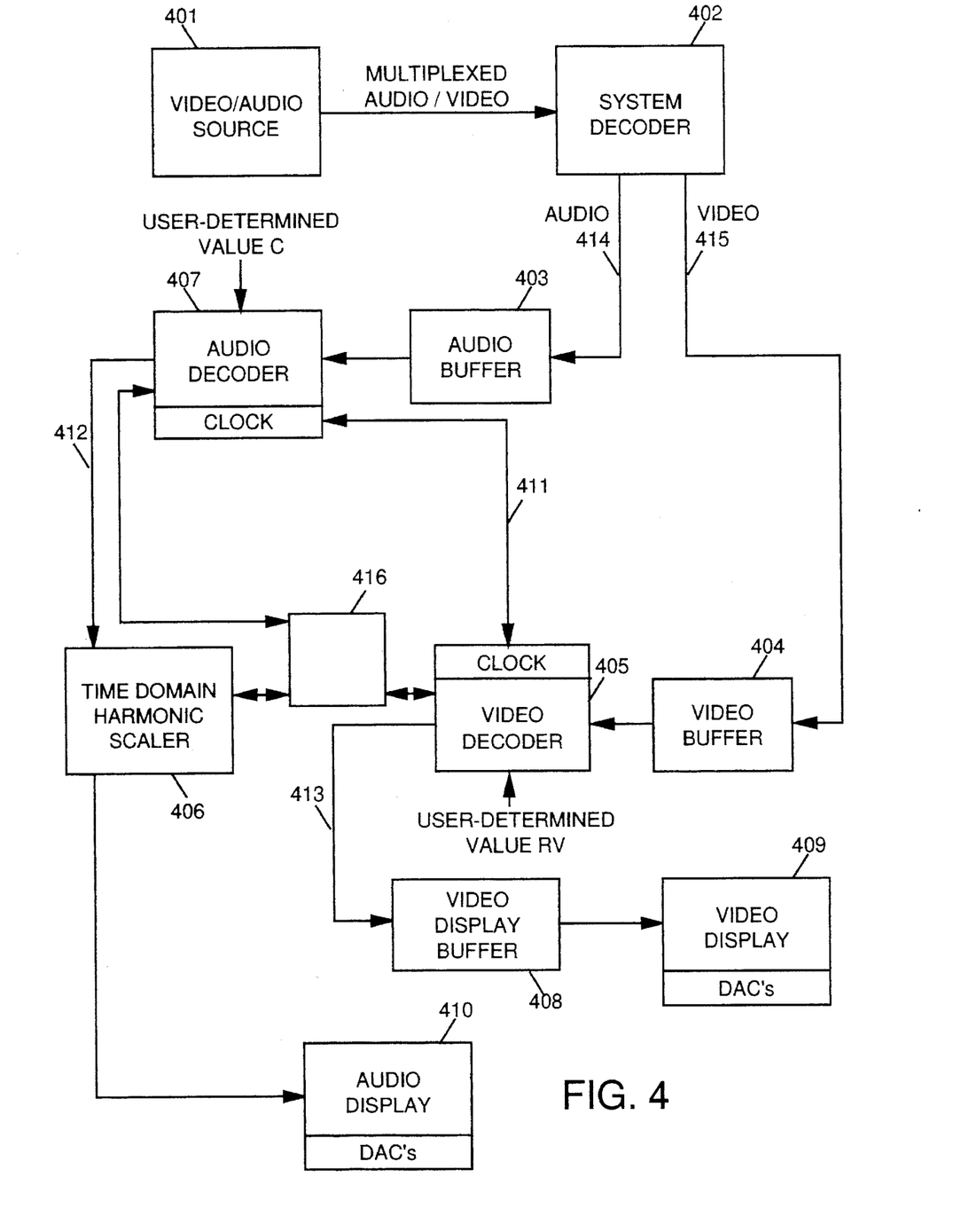
FIG. 4 is a block diagram of a playback system in which either or both of the methods of FIG. 1 and FIG. 3 are employed.

FIG. 4 is a generalized block diagram of a system in which the present invention has been implemented. System 400 comprises first, a means for receiving digital audio and video data from a source. This means includes the system decoder 402 and the audio and video signal paths 414 and 415. Audio and video buffers, 403 and 404 hold frames of data for playback. The audio decoder 407, time domain harmonic scaler 406, and audio device 410 provide the means to decode, scale and play audio frames. The video decoder 405, video display buffer 408, and video display 409 provide the means to decode and display video frames. Calculations, control functions, and synchronization functions are performed by the processor subsystem (uP) 416, the system real time clock 417 and the communications paths 411 and 418.

The clocks for the video and audio decoders and the system clock 417 are synchronized through the communications paths 411 and 418. The audio and video decoders are shown with inputs for a user-selected scaling factor. The system clock is shown with an input for a selected scaling factor called a system scaling factor. While this input can be controlled by a user, it is more often controlled by some other system which sets a specific playback rate for the A/V playback system of the present invention. In the embodiment where the audio decoder clock is the master time clock, the user-selected scaling factor C is input to the time domain harmonic scaler 406 and the audio decoder 407. The audio decoder clock controls the video decoder clock, and the scaling factor inputs for the video decoder and the system clock are not present. In the embodiment where the video decoder clock serves as the master time clock, the clock of the video decoder 405 controls the clock of the audio decoder 407, and the inputs for the audio scaling factor and the system scaling factor are not present. In this case, the microprocessor subsystem 416 inputs the scaling factor to the time domain harmonic scaler 406. In the embodiment where the system clock serves as the master time clock, both the decoder clocks synchronize themselves to the system clock, and the scaling factor inputs for the decoders are not present. Again, in this case, the microprocessor subsystem 416 controls the time domain harmonic scaler 406. The rest of the system is the same for the three embodiments. In all of the preferred embodiments, the clocks are built from 32-bit block counters, which are well known in the art, and real time clocks. The operation of the clocking system has been previously discussed.

Returning to FIG. 4, a source 401 supplies a multiplexed stream of compressed digital audio and video to the system. This source can be a communications channel, or a storage medium such as an optical disk. In any case, the source must supply data fast enough so that playback can be maintained at the maximum rate the system allows the user to choose. Alternatively, the system can determine the maximum rate of the available data stream and restrict the range of selection by the user accordingly. If the data stream is coming from a storage medium such as a CD-ROM, tape, or optical disk, the system can be provided with means to control the rate at which the data stream is supplied to the playback system. The latter arrangement is preferred.

In any case, the system decoder 402 splits the data stream into a stream of digital audio and a stream of digital video. In a system designed to work with an MPEG multiplexed A/V digital data stream, both the audio and video data streams will still be compressed after they are separated. Each frame of compressed audio is stored in the audio buffer 403 until needed by the audio decoder 407. Each frame of compressed video is stored in the video buffer 404 until needed by the video decoder 405. The audio and video buffers in the preferred embodiment are of the circular or first-in-first-out (FIFO) type. Both the video buffer and the audio buffer must be capable of holding at least two frames to allow for mid-stream changes in the playback rate. If the user speeds up playback suddenly, or if the playback time is reduced to make a slight correction, the time T required for playback in either embodiment suddenly becomes shorter. In this case, there must be at least one extra frame in each buffer to account for the instantaneous need for more data. This need for more data is only instantaneous, because the system from this point on will read frames into the buffers from the data stream at the new, faster rate, because the whole process illustrated in FIGS. 2 and 3 speeds up. Depending on the range of playback speeds allowed, and the speed of the data stream, the buffers may need to be capable of holding more frames. The inventor has found that two-frame buffers are generally adequate. However, in the case where the video decoder clock is the master time clock, an MPEG type I data stream is being played, and the user is permitted to set a value for the scaling factor RV from 0.333 to 2.9, a three-frame buffer is required for the compressed audio. In this case, a two-frame buffer is adequate for the compressed video.

As previously discussed, in addition to being FIFO buffers, the audio and video buffers provide a means for monitoring overflow and underflow conditions. In the preferred embodiment, the buffers used are of the type which output values for a consumer pointer and a producer pointer. These values are communicated to the appropriate decoder which in turn passes these values on to the processor subsystem 416 of FIG. 4. Underflow is detected when a particular decoder attempts to decode from a buffer and discovers that the buffer's consumer pointer value is equal to its producer pointer value, indicating that playback has emptied the buffer. Overflow is detected when the producer pointer reaches a predetermined value, indicating that the buffer is full.

The actual size of the buffers in bytes is completely dependent on the size of the compressed video and audio frames, which varies depending on the type of data stream being decoded and played. As an example, consider the case cited above in which a layer 2, MPEG-I data stream is being played, and the audio buffer must hold three frames. In this case, the normal rate of the data stream after audio compression is 256 kbits per second for each channel. In practice, samples from each channel of a stereo audio presentation are multiplexed together in one frame of audio, for a total compressed audio data rate of 512 kbits per second. In the preferred embodiment, the time domain harmonic scaling is performed in the digital domain, and the stereo channels are not separated again until the audio is converted from digital to analog and actually played. In this case, each frame of audio consists of 4,608 bytes; thus, a buffer large enough to hold three frames must hold at least 13,824 bytes.

The audio decoder 407, video decoder 405, time domain harmonic scaler 406, and processor subsystem 416 together provide the means for implementing the present invention. The audio decoder 407 fetches audio frames from the audio buffer 403, decompresses the audio frames, and clocks them out to the time domain harmonic scaler 406 over the communication path 412. The video decoder 405 fetches video frames from the video buffer 404, decompresses the frames, and clocks them out to the video display buffer 408 over the communication path 413. The decoders maintain synchronization because one clock in the system serves as the master time clock as previously described. The processor subsystem (uP) 416 monitors the status of the decoders and the time domain harmonic scaler 406. The processor subsystem stores values for the appropriate scaling factors, performs calculations, and monitors the amount of time being taken by the time domain harmonic scaler to play back the audio and video frames. The processor subsystem consists of a microprocessor, associated memory, clocking circuits and other support circuitry.

The rest of the system consists of apparatus for displaying digital video and apparatus for playing digital audio. The typical video display apparatus has a video display buffer 408 and a video display 409 which includes video digital-to-analog converters (DAC's). A typical digital audio playback device 410 will include audio digital-to-analog converters (DAC's) and will also include a speaker or some other transducer. The audio transducer chosen is unimportant to the operation of the invention, and is not shown for simplicity.

Figure 6:
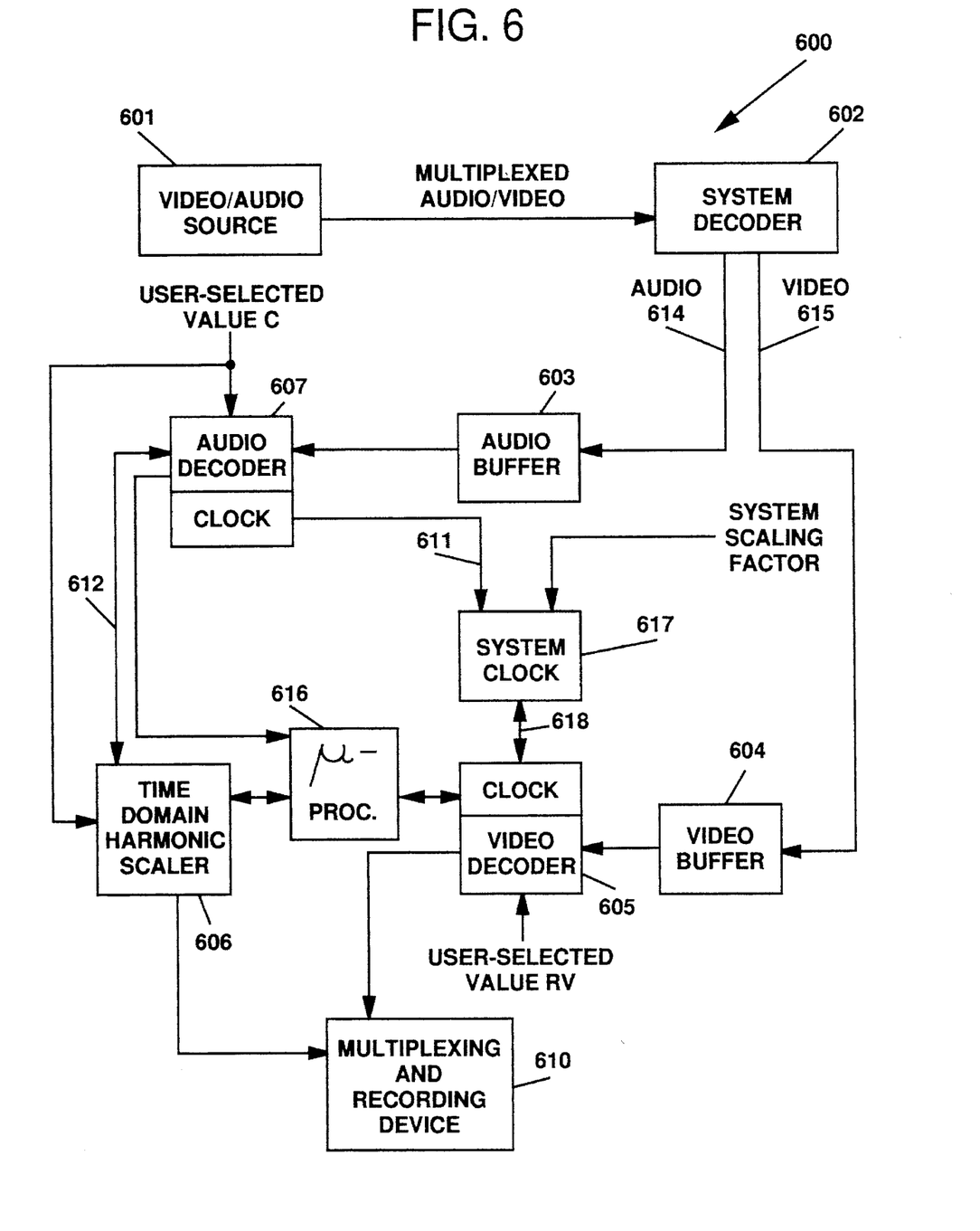
FIG. 6 is a block diagram of a playback system which is identical to that of FIG. 4, except that the audio and video are played back to a device which re-multiplexes and re-records the A/V presentation.

While the present invention has been described in terms of an audio/video playback system, it is understood that it can be employed in other systems with other embodiments. For example, instead of the audio and video decoders playing and being connected to a display and sound generating device, they can "play" and be connected to apparatus to re-multiplex and re-record the digital A/V presentation to establish a new presentation with a new recorded rate. Such a system 600 is shown in FIG. 6. Most of the system 600 is the same as system 400 of FIG. 4, as evidenced by the correlated reference numbers. However, instead of literally playing the presentation, the audio and video playback is fed into apparatus 610 where it is re-multiplexed and re-recorded. The re-recording can either be done to an actual storage media, or it may be done to a communications channel for actual capture or processing at a remote location.

The system described above can be implemented in a number of different ways. It can be built out of discrete components, each major block as described above on a separate semiconductor chip. Or all of the functions described above, except for perhaps the video display itself, can be programmed on a single specialized microprocessor, such as a digital signal processor. It is also possible to have one or more of the decoders perform the functions of the microprocessor subsystem. Even a combination of the above is possible. In such a combination, some functions would be implemented together on a single chip, others would be implemented on discrete chips. The various parts of the system can also be located remotely from each other on different adapter cards in a general purpose computer.

I claim:

1. In a variable-speed, digital audio/video playback system, a method of maintaining synchronization of a stream of digital video data with a stream of digital audio data originally recorded at a specified rate in frames per second where an audio frame comprises samples recorded in a fixed period of time corresponding to an associated video frame recording rate in frames per second, the method comprising the steps of:

> placing at least 2 frames of digital audio in an audio buffering means and at least 2 frames of digital video in a video buffering means;
>
> reading a value for a user-selected audio scaling factor, C, where C is a proportion of the originally recorded specified rate;
>
> decoding, scaling and playing, if the audio buffering means is not empty, an audio frame from the audio buffering means using the scaling factor C so that playback of the audio frame requires an audio playback time period inversely proportional to C;
>
> decoding and displaying, if the video buffering means is not empty, a frame of video from the video buffering means which corresponds to the currently playing audio frame, for a time period equal to the current audio playback time period;
>
> reading a frame of video from the video data stream into the video buffering means and a frame of audio from the audio data stream into the audio buffering means if the end of the data streams has not been reached; and
>
> re-reading the value of the user-selected audio scaling factor C in preparation for scaling and playing the next audio frame from the audio buffering means if the user-selected value to be assigned to C has been changed since the start of the immediately preceding audio playback time period.

2. In a variable-speed, digital audio/video playback system having an audio buffering means for storing at least 2 frames of digital audio and a video buffering means for storing at least 2 frames of digital video, a method of maintaining synchronization of a stream of digital video data with a stream of digital audio data originally recorded at a specified rate in frames per second where an audio frame comprises samples recorded in a fixed period of time corresponding to an associated video frame recording rate in frames per second, the method comprising the steps of:

> reading a value for a user-selected audio scaling factor, C, where C is a proportion of the originally recorded specified rate;
>
> decoding, scaling and playing, if the audio buffering means is not empty, an audio frame from the audio buffering means using the scaling factor C so that playback of the audio frame requires an audio playback time period inversely proportional to C;
>
> decoding and displaying, if the video buffering means is not empty, a frame of video from the video buffering means which corresponds to the currently playing audio frame, for a time period equal to the audio playback time period; and reading a frame of video from the video data stream into the video buffering means and a frame of audio from the audio data stream into the audio buffering means if the end of the data streams has not been reached.

3. The method according to claim 2, further comprising the step of:

> re-reading the value of the user-selected audio scaling factor C in preparation for scaling and playing another audio frame from the audio buffering means if the user-selected value to be assigned to C has been changed since the start of the immediately preceding audio playback time period.

4. A digital audio/video playback system for playing digitally encoded, simultaneous audio and video at variable speeds while maintaining synchronization between the audio and video, the system comprising:

> means for receiving digital audio data and digital video data from a source;
>
> video buffering means capable of holding at least two frames of video, the video buffering means connected to the receiving means;
>
> audio buffering means capable of holding at least two frames of audio, the audio buffering means connected to the receiving means;
>
> means for displaying a plurality of video frames in succession;
>
> means for generating sounds from electronic signals; and
>
> apparatus for maintaining synchronization of a stream of digital video data with a stream of digital audio data originally recorded at a specified rate in frames per second where each audio frame comprises samples recorded in a fixed period of time corresponding to an associated video frame recording rate in frames per second, the apparatus disposed between the audio and video buffering means and the generating and displaying means, the apparatus including:
>
>> means for reading a value for a user-selected audio scaling factor, C, where C is a proportion of the originally recorded specified rate;
>>
>> means for decoding, scaling and playing an audio frame from the audio buffering means using the scaling factor C so that playback of the audio frame requires an audio playback time period inversely proportional to C; and
>>
>> means for decoding and displaying a frame of video from the video buffering means which corresponds to the currently playing audio frame, for a time period equal to the audio playback time period.

5. Apparatus for maintaining synchronization during variable-speed playback of a stream of digital video data with a stream of digital audio data originally recorded at a specified rate in frames per second where an audio frame comprises samples recorded in a fixed period of time corresponding to an associated video frame recording rate in frames per second, the apparatus comprising:

> means for receiving digital audio data and digital video data from a source;
>
> video buffering means capable of holding at least two frames of video, the video buffering means connected to the receiving means;
>
> audio buffering means capable of holding at least two frames of audio, the audio buffering means connected to the receiving means;
>
> means for reading a value for a user-selected audio scaling factor, C, where C is proportion of the originally recorded specified rate;
>
> means for decoding, scaling and playing an audio frame from the audio buffering means using the scaling factor C so that playback of the audio frame requires an audio playback time period inversely proportional to C; and
>
> means for decoding and displaying a frame of video from the video buffering means which corresponds to the currently playing audio frame, for a time period equal to the audio playback time period.

6. A digital audio/video playback subsystem for playing digitally encoded, simultaneous audio and video at variable speeds while maintaining synchronization between the audio and video, the system comprising:

means for receiving digital audio data and digital video data from a source;

video buffering means capable of holding at least two frames of video, the video buffering means connected to the receiving means;

audio buffering means capable of holding at least two frames of audio, the audio buffering means connected to the receiving means;

means for connection to apparatus for displaying a plurality of video frames in succession;

means for connection to apparatus for generating sounds from electronic signals; and apparatus for maintaining synchronization of a stream of digital video data with a stream of digital audio data originally recorded at a specified rate in frames per second where each audio frame comprises samples recorded in a fixed period of time corresponding to an associated video frame recording rate in frames per second, the apparatus disposed between the audio and video buffering means and the connection means, the apparatus including:

means for reading a value for a user-selected audio scaling factor, C, where C is a proportion of the originally recorded specified rate;

means for decoding, scaling and playing an audio frame from the audio buffering means using the scaling factor C so that playback of the audio frame requires an audio playback time period inversely proportional to C; and means for decoding and displaying a frame of video from the video buffering means which corresponds to the currently playing audio frame, for a time period equal to the audio playback time period.

7. A system for providing synchronized display of video and audio data, a synchronized rate being set by a scaling factor input which may be varied, the system for being connected to a source of synchronized digital audio and video data, the system comprising:

means for buffering digital video data received from the source;

system clocking means, the system clocking means being controlled by the scaling factor input;

means, connected to the digital video buffering means, for outputting the digital video data to a video display, the rate of the outputting being controlled by the system clocking means;

means for buffering digital audio data from the source;

means, connected to the digital audio buffering means, for scaling and outputting the digital audio data to a sound generating means, the digital audio data outputting means controlling the scaling and the output rate of the digital audio data based upon the system clocking means so that the output of the scaled, digital audio data is in synchronism with the output of the digital video data;

means for connection to a sound generating means; and means for connection to a video display.

8. The system according to claim 7 further comprising:

a sound generating means for playing digitally encoded sounds.

9. The system according to either of claims 7 or 8 further comprising:

a video display for displaying a plurality of frames of digital video data in succession.

* * * * *